May 4, 1965  E. D. COOK  3,181,265

SINKING WEIGHT FOR SNAGGING GANG HOOKS

Filed Aug. 9, 1962

INVENTOR.
EARNEST D. COOK
BY

United States Patent Office 3,181,265
Patented May 4, 1965

3,181,265
SINKING WEIGHT FOR SNAGGING
GANG HOOKS
Earnest D. Cook, 205 S. 15th St., Norfolk, Nebr.
Filed Aug. 9, 1962, Ser. No. 215,826
3 Claims. (Cl. 43—42.7)

The present invention relates to snag fishing in which hooks are provided with weights so that they are urged downwardly as the hooks are drawn across a river bed, particularly to snag fish as the fish are feeding or resting on the river bottom, and in particular the invention includes a cigar-shaped weight having a longitudinally disposed opening for receiving a fishing line extended therethrough with a plurality of equally spaced slots for shanks of a gang hook extended from a point midway of the length of the weight to the forward end whereby the shanks of the hooks may be secured in the slots with the hooks projecting outwardly and the fishing line may extend through the weight for attachment to a similar following weight.

Various types of weights have been employed for drag hooks and particularly for gang hooks. However, hooks for this use are provided of different sizes, and it has been found difficult to apply such weights to hooks used for snagging fish without making the weights in numerous sizes and in numerous designs.

With this thought in mind this invention contemplates a weight or sinker having an elongated body with a continuous opening extended longitudinally through the center and with radially disposed slots extended from the center opening outwardly to the outer surface of the body.

The object of this invention is, therefore, to provide a weight for drag hooks which retains the hooks in equally spaced outwardly extended positions.

Another object of the invention is to provide a drag hook weight having hook receiving slots in a solid body in which the slots are formed to receive hooks of different sizes and of various designs.

Another important object of the invention is to provide a snagger weight which is designed to be installed on a hook where it should be and whereby the hook is retained on the bottom of river bed where the fish are.

A further object of the invention is to provide a snagger fish hook weight which is provided with fingers between which fish hooks are placed and wherein the ends of the fingers are crimped inwardly for retaining the hooks in the weight.

A still further object is to provide a weight for gang hooks used for snagging fish in which the weight is of simple and economical construction.

Other and further objects and advantages of the present invention will be apparent from the following detailed description, drawings and claims, the scope of the invention not being limited to the drawings themselves as the drawings are only for the purpose of illustrating a method by which the principles of this invention can be applied.

Other embodiments of the invention utilizing the same or equivalent principles may be used and structural changes may be made as desired by those skilled in the art without departing from the present invention and the purview of the appended claims.

Figure 1:
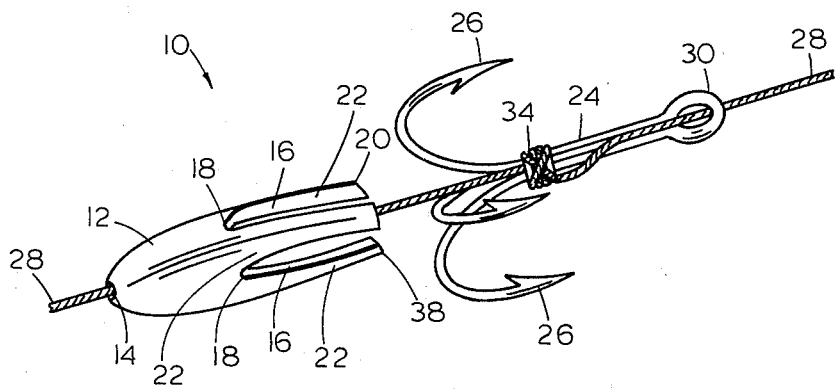
FIGURE 1 is a perspective view showing a weight on a fishing line with the hooks spaced from the weight and before the weight is installed over the shanks of the hooks.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating the cigar-shaped body of a weight, with a longitudinally disposed bore 14 extended continuously therethrough, numeral 16 equally disposed radially positioned spaced slots extended from points 18 to the leading end 20 of the body providing spaced fingers 22 forming the leading part of the body, numeral 24 shanks of fish hooks 26 positioned in the slots 16, and numeral 28 a fishing line extended through an eye 30 of the hooks and also through the bore 14.

The fishing line 28, which extends through the eye 30 of the hooks, is wrapped around shanks 24 of the hooks providing a knot 34 in a recess 36 in the body 12, and from the knot the line continues through the bore 14.

With the parts arranged as illustrated and described the corners 38 of the fingers 22 are crimped inwardly securing the weight in position on the fishing line. By this means the slots may be of sufficient width to accommodate large or small hooks, and with the weight arranged as shown in the drawing the hooks are retained in outwardly extended positions.

The slots 16 extend from the forward end 50 of the weight body 12 toward the rearward end 52 of the latter a substantial and sufficient distance for permitting the fingers 22 to extend from adjacent the rearward end of the gang hook 56, the latter comprising the hooks 26 with their shanks 24, which latter are fixed to the eye 30.

The finger portions 22 are each formed of a material adapted to be crimped such that the fingers can be pressed inwardly toward each other for gripping against the composite shank 59 of the hook 56 which latter is formed of multiple shanks 24 of the hooks 26, for gripping against the composite shank 59 for retaining the weight 12 on the gang hook 56 at times when certain outwardly extending curved portions 60 of the hooks 26 are received through the slots 16 respectively.

It will be seen that the inner ends of the slots 16 terminate a substantial distance forwardly of the rearward end 52 of the weight 12.

It will be further seen that the bore 14 has an enlarged portion 70 at its forward end for receiving the gang fish hook composite shank 59 and also for receiving the fishline knot 34 disposed around the composite shank 59.

*Operation*

In use the weight and hook assemblies are preferably used in tandem and the fishing line 28 extends from the trailing end of one weight to a similar weight following. As the weights are drawn across a river bed, or the like, the hooks are held so that they are readily embedded in a fish in the path followed by the fish.

Figure 3:
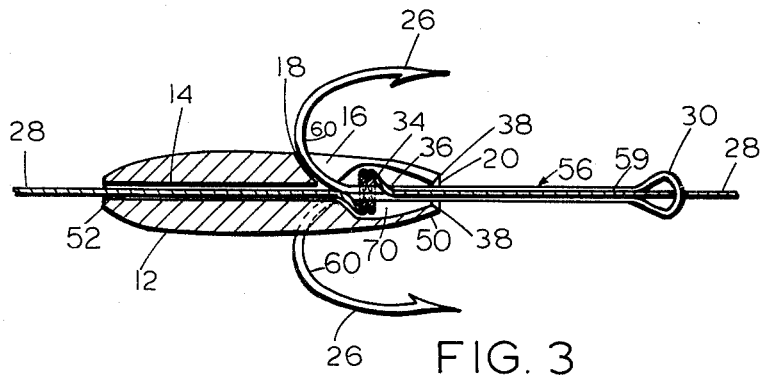
FIGURE 3 is a longitudinal section through the weight and hook assembly taken on line 3—3 of FIGURE 2, showing a hook in a slot of the weight, and also showing a fishing line extended through a center opening of the body of the weight.
Figure 2:
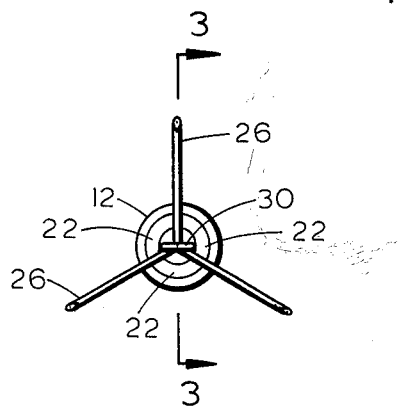
FIGURE 2 is an end elevational view of the weight and hook assembly looking toward the end of the weight opposite to the end in which the hooks are positioned.

The parts of the snagging hook weight are assembled by moving the hook assembly, shown in FIGURE 1, into the slots of the weight and crimping the ends of the fingers of the weight inwardly, as shown in FIGURE 3.

From the foregoing description it is thought to be obvious that a weighted snagging hook assembly constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

Having now described the invention that which is claimed to be new and desired to be procured by Letters Patent, is:

1. In combination: a line, a sinking weight for snagging gang hooks comprising a body having an elongated bore extending completely therethrough and having a forward and rearward end, said line extending completely through said bore, said body being provided with spaced slots extending into said body from said forward end, said slots each extending from a side of said body completely to said bore, said slots being each for the purpose of receiving an outwardly curved portion of a gang fish hook, said slots causing elongated fingers to be defined by portions of said weight disposed therebetween, said slots extending from the forward end toward the rear of said weight substantial and sufficient distances so as to permit said fingers to extend from adjacent the rearward end of a gang hook forwardly alongside the shank portion of the gang hook and said finger portions of said weight being formed of a malleable material adapted to permit said fingers to be pressed inwardly and bent toward each other for gripping against the shank of the gang hook for retaining said weight on a gang hook at times when the curved portions are received through said slots respectively, and the inner ends of said slots each terminating forwardly of the rearward end of said weight.

2. A sinking weight for snagging gang hooks comprising a body having an elongated bore extending completely therethrough and having a forward and rearward end, said body being provided with spaced slots extending into said body from said forward end, said slots each extending from a side of said body completely to said bore, said slots being each for the purpose of receiving an outwardly curved portion of a gang fish hook, said body portion having elongated fingers between said slots, said slots extending from the forward end toward the rear of said weight substantial and sufficient distances so as to permit said fingers to extend from adjacent the rearward end of a gang hook forwardly alongside the shank portion of the gang hook, and said finger portions of said weight being formed of a malleable material adapted to permit said fingers to be pressed inwardly and bent toward each other for gripping against the shank of the gang hook for retaining said weight on a gang hook at times when the curved portions are received through said slots respectively, and the inner ends of said slots each terminating forwardly of the rearward end of said weight, said bore having an enlarged portion at its forward end for receiving a gang fish hook shank, and a fish line knot disposed around said gang fish hook shank.

3. A sinking weight for snagging gang hooks comprising a body having an elongated bore extending completely therethrough and having a forward and rearward end, said body being provided with spaced slots extending into said body from said forward end, said slots each extending from a side of said body completely to said bore, said slots being each for the purpose of receiving an upwardly curved portion of a gang fish hook, said body portion having elongated fingers between said slots, said slots extending from the forward end toward the rear of said weight substantial and sufficient distances so as to permit said fingers to extend from adjacent the rearward end of a gang hook forwardly alongside the shank portion of the gang hook, and said finger portions of said weight being formed of a malleable material adapted to permit said fingers to be pressed inwardly and bent toward each other for gripping against the shank of the gang hook for retaining said weight on a gang hook at times when the curved portions are received through said slots respectively, and the inner ends of said slots each terminating forwardly of the rearward end of said weight, in further combination with a fish line and gang hook, said gang hook received therein as described, said gang hook having a forward eye receiving said fish line therethrough, said fish line being fixed to the shank of said gang hook and a portion of said fish line extending rearwardly of said gang hook through said bore of said weight.

References Cited by the Examiner

UNITED STATES PATENTS

| | | | |
|---|---|---|---|
| 637,169 | 11/99 | Slotterbeck | 43—42.7 |
| 2,492,557 | 12/49 | Deimler | 43—44.82 X |
| 2,520,544 | 8/50 | Hook | 43—42.7 |
| 2,793,459 | 5/57 | Multanen | 43—42.38 X |

FOREIGN PATENTS 3,851    2/95    Great Britain.

ABRAHAM G. STONE, *Primary Examiner.*

MELVIN D. REIN, *Examiner.*